US008681806B2

(12) United States Patent
Bucknell et al.

(10) Patent No.: US 8,681,806 B2
(45) Date of Patent: Mar. 25, 2014

(54) METHOD FOR COMMUNICATING IN A NETWORK AND RADIO STATIONS ASSOCIATED

(75) Inventors: Paul Bucknell, Brighton (GB); Milos Tesanovic, Cambridge (GB); Matthew P. J. Baker, Canterbury (GB); Timothy J. Moulsley, Caterham (GB)

(73) Assignee: Koninklijke Philips N.V., Eindhoven (NL)

( * ) Notice: Subject to any disclaimer, the term of this patent is extended or adjusted under 35 U.S.C. 154(b) by 321 days.

(21) Appl. No.: 12/996,780

(22) PCT Filed: Jun. 18, 2009

(86) PCT No.: PCT/IB2009/052602
§ 371 (c)(1),
(2), (4) Date: Dec. 8, 2010

(87) PCT Pub. No.: WO2009/156917
PCT Pub. Date: Dec. 30, 2009

(65) Prior Publication Data
US 2011/0085566 A1 Apr. 14, 2011

(30) Foreign Application Priority Data
Jun. 23, 2008 (EP) .................................... 08305314

(51) Int. Cl.
*H04L 12/26* (2006.01)
*H04L 12/56* (2011.01)
*H04L 12/54* (2013.01)

(52) U.S. Cl.
USPC ............................ 370/412; 370/389; 370/428

(58) Field of Classification Search
USPC .......................................... 370/389, 412, 428
See application file for complete search history.

(56) References Cited

U.S. PATENT DOCUMENTS

| 2003/0120802 A1* | 6/2003 | Kohno ........................ 709/237 |
| 2005/0254508 A1* | 11/2005 | Aksu et al. ................... 370/428 |
| 2007/0223385 A1* | 9/2007 | Berly et al. .................. 370/250 |
| 2007/0249287 A1* | 10/2007 | Das et al. ...................... 455/68 |
| 2011/0019544 A1* | 1/2011 | Lemaire et al. ............... 370/230 |

FOREIGN PATENT DOCUMENTS

| EP | 1599063 A1 | 11/2005 |
| EP | 1710963 A1 | 10/2006 |

OTHER PUBLICATIONS

3GPP TS 36.321 V8.10: 3rd Generation Partnership Project; Technical Specification Group Radio Access Network; Evolved Universal Terrestrial Radio Access (E-UTRA) Medium Access Control (MAC) Protocol Specification (Release 8), Mar. 2008, Technical Specification, 30 page Document.

* cited by examiner

*Primary Examiner* — Ronald Abelson

(57) ABSTRACT

The present invention relates to a method for communicating in a network comprising a primary station and at least one secondary station, said secondary station comprising a buffer containing data packets to be transmitted to the primary station, the method comprising the step of the secondary station transmitting an indication of the buffer status to the primary station, said indication comprising information about history of said buffer.

9 Claims, 1 Drawing Sheet

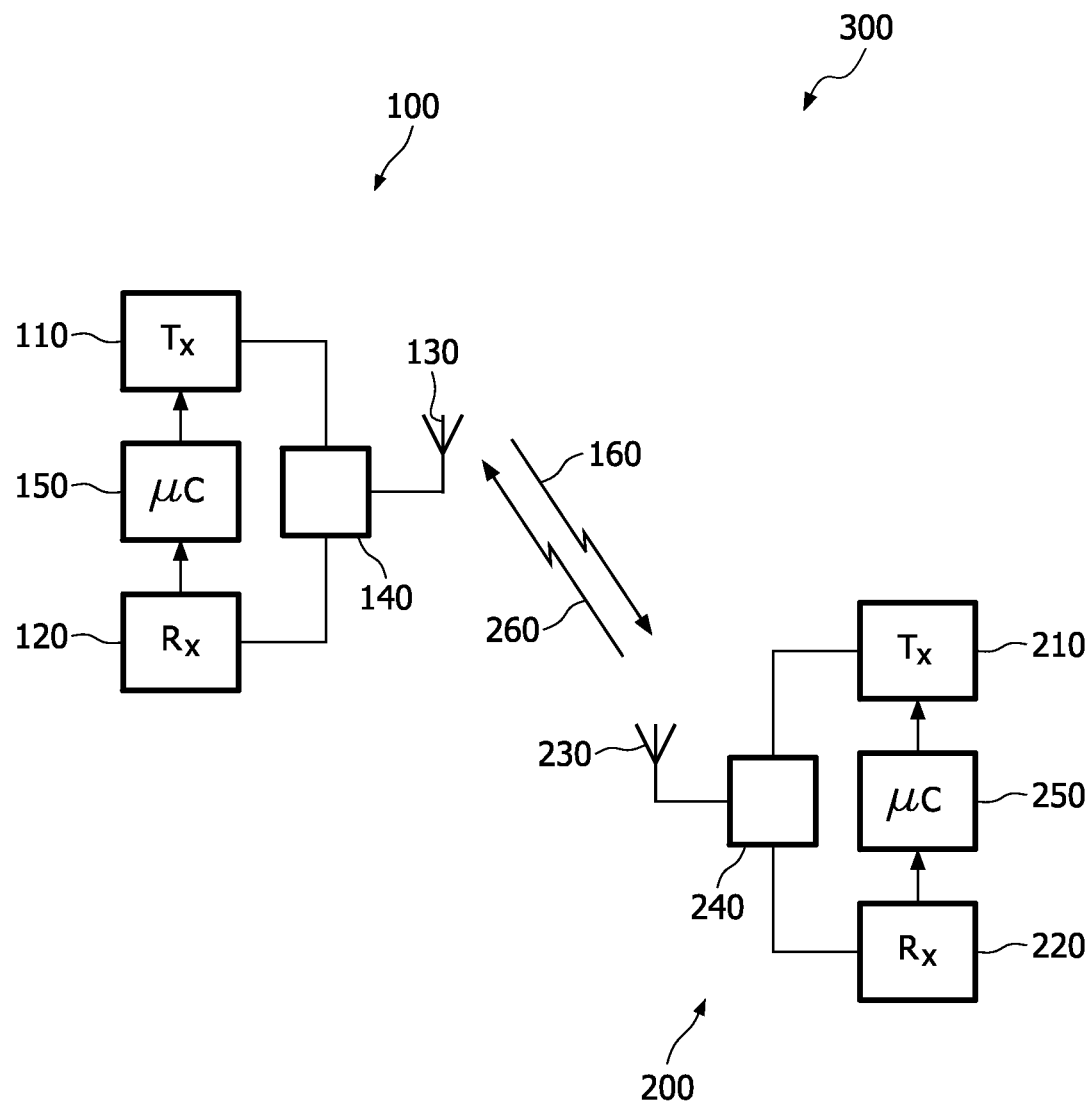

METHOD FOR COMMUNICATING IN A NETWORK AND RADIO STATIONS ASSOCIATED

FIELD OF THE INVENTION

The present invention relates to a method for communicating in a network and to radio stations carrying out this method. More specifically, this invention may be implemented in a mobile communication network, like a UMTS system.

BACKGROUND OF THE INVENTION

Many communication systems operate using a centralised scheduler which is responsible for allocating transmission resources to different nodes. A typical example is the uplink of the UMTS LTE (Long Term Evolution), where the uplink transmissions from different secondary stations or mobile station or User Equipments (UEs) are scheduled in time and frequency by the primary station or base station or Node B (eNB). The primary station transmits a "scheduling grant" message to a secondary station, indicating a particular time-frequency resource for the secondary station's transmission typically around 3 ms after the transmission of the grant message. The grant message also typically specifies the data rate and/or power to be used for the secondary station's transmission.

In order for the primary station to issue appropriate grants, it needs to have sufficient information about the amount, type of data and the urgency of it awaiting transmission in the buffer of each secondary station. This information can be used to inform the scheduler in the primary station of either the satisfaction level of individual secondary stations or secondary stations whose service might be close to being dropped.

In LTE, a number of different types of buffer status report (BSR) messages are therefore defined, which may be transmitted from a secondary station to the primary station when certain triggers occur. The state of the art in this respect is defined by the current version of 3GPP TS36.321 (as of June 2008), §5.4.5, incorporated herein by reference.

The Buffer Status reporting procedure is used to provide the serving primary station with information about the amount of data in the Uplink buffers of the secondary station. This is currently defined in 36.321 (as of June 2008), §6.1.3.1 incorporated herein by reference. A problem with this procedure defined in 36.321 is that the content of the buffer status report only identifies the total amount of data in bytes. This gives some information to scheduler but this may not be sufficient for the scheduler in the primary station to make the best possible decision, especially in some situations, as for example when VoIP traffic is being transmitted perhaps together with other services from the secondary station with different Quality of Service (QoS) requirements, where absolute data buffer size in bytes is not the most appropriate measure of how the QoS requirement is currently being satisfied.

SUMMARY OF THE INVENTION

It is an object of the invention to propose a method for communicating alleviating this problem.

Another object of this invention is to provide a method for communicating in a network which provides with appropriate information to the primary station.

Still another object of the invention is to provide a method for communicating in a network which enables to gives the primary station sufficient information without causing too much overhead.

In accordance with a first aspect of the invention, a method is proposed for communicating in a network comprising a primary station and at least one secondary station, said secondary station comprising a buffer containing data packets to be transmitted to the primary station, the method comprising the step of the secondary station transmitting an indication of the buffer status to the primary station, said indication comprising information about at least one of history and future of said buffer.

In accordance with another aspect of the invention, a secondary station is proposed, said secondary station comprising a buffer containing data packets to be transmitted to a primary station, the secondary station comprising transmitting means for transmitting an indication of the buffer status to the primary station, said indication comprising information about history of said buffer.

These aspects of the invention are based on the recognition that additional information could be incorporated in Buffer Status Report. Indeed, it would be preferable for the secondary station to indicate other indicators of the buffer as an alternative to or in addition to the total size.

Such indicators could include:
An indication of the age of the oldest packet in the buffer
An indication of the number of packets dropped by the secondary station due to a delay constraint being exceeded.
Number (or total size of) re-transmissions.
Prediction of future transmissions. As a consequence, a primary station will benefit from additional information other than the amount of data in the buffer in order to make the best decision on the uplink resources to grant the secondary station. If the secondary station is able to also inform the primary station of the age of the packets in the data buffer and/or any dropped packets and/or the number of packets under retransmission, then the scheduler performance and overall system performance in terms of spectrum efficiency will be improved. For example the performance of a proportionate fair scheduling algorithm in the primary station can be improved with improved information on the Quality of Service of the services being transmitted by the secondary station.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawing, wherein:

FIG. 1 is a block diagram of a network in which the invention is implemented.

DETAILED DESCRIPTION OF THE INVENTION

The present invention relates to a system of communication 300 as depicted on FIG. 1, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a downlink channel 160 and transmission from the secondary radio station 200 to the first radio station 100 takes place on an uplink channel 260.

From time to time, the secondary station 200 transmits on the uplink channel 260 an indication of the status of its buffer containing data to be transmitted. This Buffer Status Report can be of different types. A short Buffer Status Report (BSR) comprises the identity of a single group of logical channels, together with a 6-bit indicator of the amount of data corresponding to that group of logical channels currently residing in the secondary station's buffer awaiting transmission. A long BSR comprises 4 concatenated short BSRs, each corresponding to a different group of logical channels.

The present invention provides a means to send a buffer status report from the secondary station 200 including in a first embodiment at least one indication of one of the following indicators of the buffer as an alternative to or in addition to the total size:
- Age of the oldest packet in the buffer like:
  - Age of the oldest packet in the buffer for a specific group of logical channels defined to have similar QoS requirements
  - Age of the oldest packet across the whole range of logical channels
  - Age of the oldest packet where the age has passed a pre-determined threshold
- Number of packets dropped by the secondary station:
  - Number of packets dropped by the application
    - Possibly reported per logical channel or group of logical channels
  - Number of packets dropped by PDCP (PDCP SDUs)
    - Possibly reported per logical channel or group of logical channels
- Number of packets under re-transmission
  - Possibly reported per logical channel or group of logical channels
  - Possibly when number of packets buffered exceeds a threshold
- Number of HARQ (Hybrid Automatic ReQuest) failures.
- Prediction of future amount of data or transmission rate.

Typically, the age of a packet could be defined in terms of the time at which the data was created by an application, or in terms of the time remaining until it should be delivered to the end destination. Packets may be dropped if their age exceeds a threshold (e.g. packets which have been in the buffer so long, that they cannot be delivered to the end destination in time to be useful, or to meet latency requirements).

It is to be noted that the number of packets dropped by higher layers (PDCP) is known only for higher layers, as defined in 36.323, §5.9 incorporated herein by reference. It is indicated in that, when the Discard_Timer expires for a PDCP SDU the secondary station shall discard the PDCP PDU along with the corresponding PDCP SDU. If the corresponding PDCP PDU has already been submitted to lower layers the discard is indicated to lower layers.

In order that the buffer status report comprise the at least one indication of at least one of the above indicators, the buffer status report may be modified from a buffer status report comprising the total size. In accordance with the first embodiment, some mechanisms can be used to indicate that a buffer status report is a modified buffer status report, i.e. that something other than size of data in buffer is reported. In accordance with a first example of the first embodiment, a Semi-static configuration is proposed by Radio Resource Control signalling that certain logical channel groups are reported in terms of the modified status instead of buffer data size in bytes. This means that parallel signaling or higher layer signalling indicates which type of indication is comprised in each BSR corresponding to each logical channel.

According to a second example of the first embodiment, a buffer status report may be either a non-modified buffer status report or a modified buffer status report comprising one or more different types of indication. Then, the type of BSR is signalled by, for example, one of the following:
- one or more bits otherwise used for a logical channel identification;
- one value of logical channel ID;
- one or more bits out of the 6 bits allowed for the buffer status report.

In the latter of these examples, a reduced number of bits reported in the BSR can be used for the buffer status reporting. For example in some situations not all of the available bits defined for buffer status reports may be required and transmitted, for example when lower bit rate services such as VOIP are being transmitted. The remaining bits could be used to indicate which kind of indication is used. This modified number of bits for the value of the buffer status report could be for example dependent on system bandwidth and/or UE capability class.

For example, in small bandwidth cells where a large range of values is not required to report the smaller maximum amount of data that can be sent in one transport block in a TTI, some bits in the BSR can be used to indicate the kind of indication used, or to indicate the value of a second kind of indication.

As another example, a UE of a low capability class would not need to be able to report the full range of values which can be signalled with 6 bits, and therefore some bits in the BSR can be used to indicate the kind of indication used, or to indicate the value of a second kind of indication.

In the above two examples, the signalling to indicate the modification of the BSR is implicit in the signalling of the system bandwidth or UE capability class respectively.

According to another example of the first embodiment, the type of indication comprised in a buffer status report may be semi-statically configured by RRC (Radio Resource Control) signalling. This RRC signalling may apply to one, more than one or all logical channels or logical channel groups. Thus a parameter such as a logical channel identity may be configured to correspond to a particular indicator from the above list.

According to another example of the first embodiment, the type of indication comprised in a buffer status report may be indicated by pre-configuring specific combinations of buffer reports to correspond to an indicator from the above indicators.

It should be understood that the preceding examples could be used whatever the indicated value in the BSR is, and should not limited to indication of history or future of the buffer status.

A modified buffer status report can be sent from time to time instead of a conventional BSR, and/or in response to some events as explained below.

In some embodiments the criteria used to determine in the primary station or the secondary station whether a modified buffer status report is transmitted may depend on at least one characteristic of the data. For instance, depending on:

An indication of the priority of the data;
QoS parameters of the data (e.g. latency requirements, or a function thereof)
an identity of a logical channel or group of logical channels to which the data is assigned;
the amount of data which had arrived in the buffer;
the rate of arrival of data in the buffer;
the time since the previous arrival of data in the buffer.

In accordance with the UMTS specification, a Buffer Status Report (BSR) shall be triggered if any of the following events occur:

Uplink data arrives in the secondary station transmission buffer and the data belongs to a logical channel with higher priority than those for which data already existed in the secondary station transmission buffer, in which case the BSR is referred below to as "Regular BSR";
Uplink resources are allocated and number of padding bits is larger than the size of the Buffer Status Report MAC control element, in which case the BSR is referred below to as "Padding BSR";
a serving cell change occurs, in which case the BSR is referred below to as "Regular BSR";
the PERIODIC BSR TIMER expires, in which case the BSR is referred below to as "Periodic BSR".

For Regular and Periodic BSR:
if only one Group of logical channels (LCG) has buffered data in the TTI where the BSR is transmitted: report short BSR;
else if more than one LCG has buffered data in the TTI where the BSR is transmitted: report long BSR.

For padding BSR:
if the number of padding bits is equal to or larger than the size of the Short BSR but smaller than the size of the Long BSR, report Short BSR of the LCG with the highest priority logical channel with buffered data;
else if the number of padding bits is equal to or larger than the size of the Long BSR, report Long BSR.

If the Buffer Status reporting procedure determines that a BSR has been triggered since the last transmission of a BSR:
if the UE has UL resources allocated for new transmission for this TTI:
instruct the Multiplexing and Assembly procedure to generate a BSR MAC control element;
restart the PERIODIC BSR TIMER.
else if a Regular BSR has been triggered since the last transmission of a BSR:
a Scheduling Request shall be triggered.

Even if multiple events occur by the time a BSR can be transmitted, only one BSR will be included in the MAC PDU. A pending BSR shall be cancelled in case the Uplink grant can accommodate all pending data but is not sufficient to accommodate the BSR MAC control element in addition. Similarly, these events may cause the triggering of a modified BSR.

Note also that an embodiment in which the secondary station configures a pattern in time is possible for the transmission of modified buffer status reports which contain alternative secondary station buffer information.

In accordance with the first embodiment, the method could comprise a configuration in which the primary station configures every Xth buffer status reports to indicate number of dropped packets in the period corresponding to the last X previously reported buffer status reports.

A further example of this embodiment could comprise a configuration in which the primary station configures that any buffer status reports in every Yth radio frame shall indicate the number of dropped packets in the period corresponding to predetermined number of previously reported buffer status reports.

This invention may be implemented in mobile communication systems where communication devices utilize centralized scheduling, such as UMTS and LTE.

Moreover, this invention could as well be implemented for hubs which route calls from multiple terminals to base stations. Such devices would appear like a secondary station from the point of view of the network.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and the art of transmitter power control and which may be used instead of or in addition to features already described herein.

The invention claimed is:

1. A method for communicating in a network that comprises a primary station and at least one secondary station, wherein said secondary station comprises a buffer containing data packets to be transmitted to the primary station, the method comprising: transmitting, via the secondary station, an indication of the buffer status to the primary station, wherein said indication comprises information about at least one of history and future of said buffer, further wherein the information about history of said buffer comprises at least an indication of a number of data packets dropped by the secondary station, wherein the number of data packets dropped is estimated per logical channel or group of logical channels.

2. The method of claim 1, wherein the information about history of said buffer further comprises an indication of an age of an oldest data packet currently stored in the buffer for a set of logical channels having similar quality of service requirements.

3. The method of claim 2, wherein the indication of the age of the oldest data packet is further an indication of whether said age is above a predetermined threshold.

4. The method of claim 1, wherein the information about history of said buffer further comprises an indication of a number of data packets being currently under retransmission.

5. The method of claim 1, further wherein the number of data packets dropped is estimated for groups of logical channels.

6. The method of claim 1, wherein the step of transmitting, via the secondary station, an indication of the buffer history is carried out if one of the following conditions is fulfilled:
a priority of any of the data packets in the buffer is above a predetermined threshold,
a rate of arrival of data in the buffer is above a predetermined threshold,
a number of data packets in the buffer is above a predetermined threshold, a number of data packets arrived in the buffer is above a predetermined threshold, and an amount of data in the buffer is above a predetermined threshold.

7. The method of claim 1, further comprising the step of transmitting, via the secondary station, an indication of the buffer status without information about history of the buffer at regular intervals, wherein the step of transmitting the indication with information on history of the buffer is carried out if one of the following conditions is fulfilled:

a priority of any of the data packets in the buffer is above a predetermined threshold, a rate of arrival of data in the buffer is above a predetermined threshold, a number of data packets in the buffer is above a predetermined threshold, a number of data packets arrived in the buffer is above a predetermined threshold, and an amount of data in the buffer is above a predetermined threshold.

8. A secondary station comprising means for communicating with a primary station, a buffer containing data packets to be transmitted to the primary station, and transmitting means for transmitting an indication of the buffer status to the primary station, wherein said indication comprises information about history of said buffer, further wherein the information about history of said buffer comprises at least an indication of a number of data packets dropped by the secondary station, wherein the number of data packets dropped is estimated per logical channel or group of logical channels.

9. A primary station comprising means for communicating with at least one secondary station, means for receiving an indication of the buffer status from the secondary station, wherein said indication comprises information about history of said buffer, and allocation means for allocating a transmission resource to the secondary station in accordance with the information about history of the buffer, further wherein the information about history of said buffer comprises at least an indication of a number of data packets dropped by the secondary station, wherein the number of data packets dropped is estimated per logical channel or group of logical channels.

* * * * *